US012076989B2

(12) United States Patent
Fukuda et al.

(10) Patent No.: US 12,076,989 B2
(45) Date of Patent: Sep. 3, 2024

(54) LIQUID DISCHARGE HEAD AND RECORDING DEVICE

(71) Applicant: KYOCERA CORPORATION, Kyoto (JP)

(72) Inventors: Yasuhiko Fukuda, Kirishima (JP); Takayuki Yamamoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 170 days.

(21) Appl. No.: 17/764,199

(22) PCT Filed: Sep. 16, 2020

(86) PCT No.: PCT/JP2020/035155
§ 371 (c)(1),
(2) Date: Mar. 28, 2022

(87) PCT Pub. No.: WO2021/065524
PCT Pub. Date: Apr. 8, 2021

(65) Prior Publication Data

US 2022/0332115 A1 Oct. 20, 2022

(30) Foreign Application Priority Data

Sep. 30, 2019 (JP) ................................ 2019-178670

(51) Int. Cl.
*B41J 2/14* (2006.01)
*B41J 2/045* (2006.01)

(52) U.S. Cl.
CPC ....... *B41J 2/14209* (2013.01); *B41J 2/04541* (2013.01); *B41J 2002/14225* (2013.01); *B41J 2002/14362* (2013.01); *B41J 2002/14491* (2013.01)

(58) Field of Classification Search
CPC ................ B41J 2/14209; B41J 2/04541; B41J 2002/14225; B41J 2002/14362; B41J 2002/14491
See application file for complete search history.

(56) References Cited

U.S. PATENT DOCUMENTS 7,216,960 B2 * 5/2007 Imanaka .............. B41J 2/04543 347/57
8,651,623 B2 * 2/2014 Saikawa ................ B41J 2/1621 347/50
2016/0318301 A1 11/2016 Iijima

FOREIGN PATENT DOCUMENTS

JP 2017149108 A 8/2017

* cited by examiner

*Primary Examiner* — Geoffrey S Mruk
(74) *Attorney, Agent, or Firm* — HAUPTMAN HAM, LLP

(57) ABSTRACT

A liquid discharge head includes a head body, a plurality of driver ICs, a flexible substrate, and a wiring board. The head body includes a discharge hole configured to discharge a liquid. The plurality of driver ICs controls drive of the head body. The plurality of driver ICs are mounted at the flexible substrate, and the flexible substrate is electrically connected to the head body. The wiring board includes a plurality of connectors. In addition, the flexible substrate includes: a plurality of protruding portions configured to protrude in the same direction and each including a tip portion to be inserted into corresponding one of the plurality of connectors; and a slit formed between the protruding portions adjacent to each other and extending up to a region between the driver ICs adjacent to each other.

12 Claims, 18 Drawing Sheets

LIQUID DISCHARGE HEAD AND RECORDING DEVICE

RELATED APPLICATIONS

The present application is a National Phase of International Application Number PCT/JP2020/035155 filed Sep. 16, 2020, and claims priority based on Japanese Patent Application No. 2019-178670, filed Sep. 30, 2019.

TECHNICAL FIELD

The disclosed embodiments relate to a liquid discharge head and a recording device.

BACKGROUND ART

Inkjet printers and inkjet plotters that utilize an inkjet recording method are known as printing apparatuses. A liquid discharge head for discharging liquid is mounted in printing apparatuses using such an inkjet method. In addition, in such a liquid discharge head, a plurality of driver ICs are mounted on the same flexible substrate (see, for example, Patent Document 1).

CITATION LIST

Patent Literature

Patent Document 1: JP 2017-149108 A

SUMMARY OF INVENTION

A liquid discharge head according to one aspect of an embodiment includes a head body, a plurality of driver ICs, a flexible substrate, and a wiring board. The head body includes a discharge hole configured to discharge a liquid. The plurality of driver ICs control drive of the head body. A plurality of the driver ICs are mounted at the flexible substrate, and the flexible substrate is electrically connected to the head body. The wiring board includes a plurality of connectors. In addition, the flexible substrate includes: a plurality of protruding portions configured to protrude in a same direction and each including a tip portion to be inserted into corresponding one of the plurality of connectors; and a slit formed between the protruding portions adjacent to each other and extending up to a region between the driver ICs adjacent to each other.

In addition, a liquid discharge head according to one aspect of an embodiment includes a head body, a plurality of driver ICs, a flexible substrate, and a wiring board. The head body includes a discharge hole configured to discharge a liquid. The plurality of driver ICs control drive of the head body. A plurality of the driver ICs are mounted at the flexible substrate, and the flexible substrate is electrically connected to the head body. The wiring board includes a plurality of connectors. In addition, the flexible substrate includes: a plurality of protruding portions configured to protrude in a same direction and each including a tip portion to be inserted into corresponding one of the plurality of connectors; and a through hole formed along a protruding direction of the protruding portions and extending up to a region between the driver ICs adjacent to each other.

DESCRIPTION OF EMBODIMENTS

Embodiments of a liquid discharge head and a recording device disclosed in the present application will be described in detail below with reference to the accompanying drawings. The disclosure is not limited by the following embodiments.

Inkjet printers and inkjet plotters that utilize an inkjet recording method are known as printing apparatuses. A liquid discharge head for discharging liquid is mounted in printing apparatuses using such an inkjet method.

A piezoelectric method is another method for discharging liquid from a liquid discharge head. In a liquid discharge head that uses such a piezoelectric method, a part of a wall of an ink channel is bent and displaced by a displacement element to mechanically pressurize and discharge the ink in the ink channel.

In addition, in order to drive such a piezoelectric element, a plurality of driver ICs are provided at the liquid discharge head. Furthermore, in the liquid discharge head, these plurality of driver ICs are mounted at the same flexible substrate.

However, in the existing liquid discharge head, the large amount of heat is generated from the driver ICs at the time of operation. This leads to an increase in thermal interference between driver ICs adjacent to each other, which may cause unstable operation of the driver ICs.

In view of the situation described above, it is expected to achieve a liquid discharge head and a recording device that can overcome the problem described above and can reduce the thermal interference between driver ICs adjacent to each other.

Printer Configuration

Figure 1:
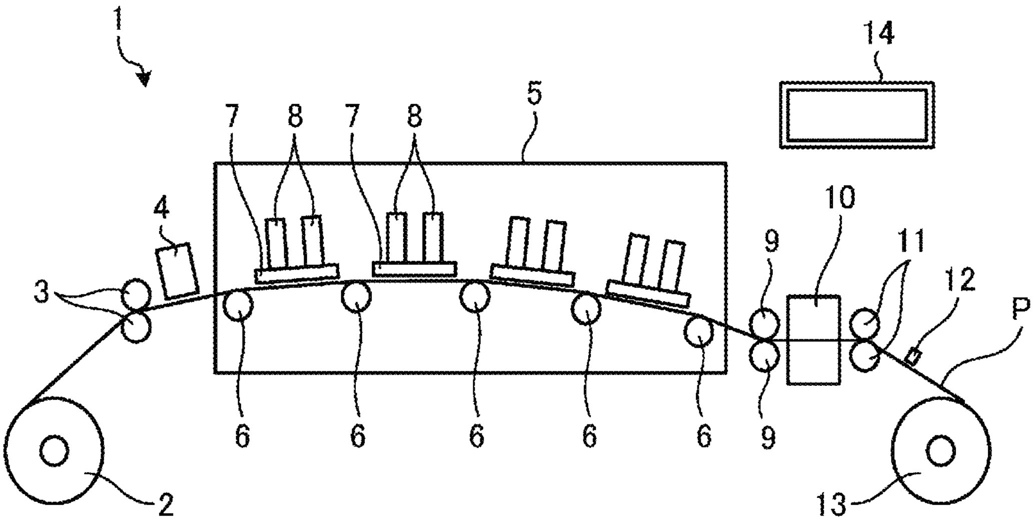
FIG. 1 is an explanatory view (1) of a recording device according to an embodiment.
Figure 2:
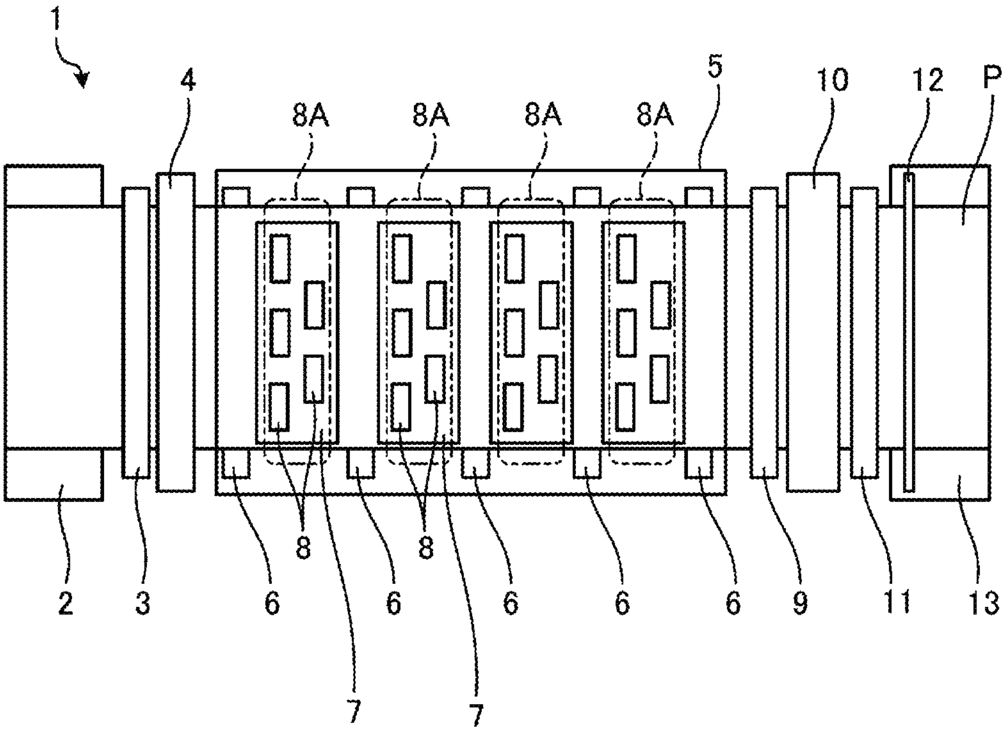
FIG. 2 is an explanatory view (2) of the recording device according to the embodiment.

First, a description will be given on an overview of a printer 1 that is one example of a recording device according to an embodiment, with reference to FIGS. 1 and 2. FIGS. 1 and 2 are explanatory views of the printer 1 according to the embodiment.

Specifically, FIG. 1 is a schematic side view of the printer 1 and FIG. 2 is a schematic plan view of the printer 1. The printer 1 according to the embodiment is, for example, a color inkjet printer.

As illustrated in FIG. 1, the printer 1 includes a paper feed roller 2, guide rollers 3, an applicator 4, a head case 5, a plurality of conveying rollers 6, a plurality of frames 7, a plurality of liquid discharge heads 8, conveying rollers 9, a dryer 10, conveying rollers 11, a sensor 12, and a collection roller 13. The conveying rollers 6 are examples of a conveyor.

The printer 1 includes a controller 14 that controls the paper feed roller 2, the guide rollers 3, the applicator 4, the head case 5, the plurality of conveying rollers 6, the plurality of frames 7, the plurality of liquid discharge heads 8, the conveying rollers 9, the dryer 10, the conveying rollers 11, the sensor 12, and the collection roller 13.

By landing droplets on the printing sheet P, the printer 1 records images and characters on the printing sheet P. The printing sheet P is an example of a recording medium. The printing sheet P is rolled on the paper feed roller 2 prior to use. In this state, the printer 1 conveys the printing sheet P from the paper feed roller 2 to the inside of the head case 5 via the guide rollers 3 and the applicator 4.

The applicator 4 uniformly applies a coating agent over the printing sheet P. With surface treatment thus performed on the printing sheet P, the printing quality of the printer 1 can be improved.

The head case 5 houses the plurality of conveying rollers 6, the plurality of frames 7, and the plurality of liquid discharge heads 8. The inside of the head case 5 is formed with a space separated from the outside except for a part connected to the outside such as parts where the printing sheet P enters and exits.

If necessary, the controller 14 controls at least one of controllable factors of the internal space of the head case 5, such as temperature, humidity, and barometric pressure. The conveying rollers 6 convey the printing sheet P to the vicinity of the liquid discharge heads 8, inside the head case 5.

The frames 7 are rectangular flat plates, and are positioned above and close to the printing sheet P conveyed by the conveying rollers 6. As illustrated in FIG. 2, the frames 7 are positioned such that the longitudinal direction of the frames 7 is orthogonal to the conveyance direction of the printing sheet P. Furthermore, the plurality of (e.g., four) frames 7 are located inside the head case 5 along the conveyance direction of the printing sheet P.

Note that, in the following description, a direction in which a printing sheet P is transferred is also referred to as a "sub scanning direction," and a direction orthogonal to this sub scanning direction and parallel to the printing sheet P is also referred to as a "main scanning direction".

Liquid, for example, ink, is supplied to the liquid discharge heads 8 from a liquid tank (not illustrated). Each liquid discharge head 8 discharges the liquid supplied from the liquid tank.

The controller 14 controls the liquid discharge heads 8 based on data of an image, characters, and the like to discharge the liquid toward the printing sheet P. The distance between each liquid discharge head 8 and the printing sheet P is, for example, approximately 0.5 to approximately 20 mm.

The liquid discharge heads 8 are fixed to the frame 7. For example, the liquid discharge heads 8 are fixed to the frame 7 at both end portions in the longitudinal direction. The liquid discharge heads 8 are positioned such that the longitudinal direction of the liquid discharge heads 8 is orthogonal to the conveyance direction of the printing sheet P.

That is, the printer 1 according to the embodiment is a so-called line printer in which the liquid discharge heads 8 are fixed inside the printer 1. Note that the printer 1 according to the embodiment is not limited to a line printer and may also be a so-called serial printer.

A serial printer is a printer employing a method of alternately performing operations of recording while moving the liquid discharge heads 8 in a manner such as reciprocation in a direction intersecting (e.g., substantially orthogonal to) the conveyance direction of the printing sheet P, and conveying the printing sheet P.

As illustrated in FIG. 2, a plurality of (e.g., five) liquid discharge heads 8 are fixed to one frame 7. FIG. 2 illustrates an example in which three liquid discharge heads 8 are located on the forward side and two liquid discharge heads 8 are located on the rear side, in the conveyance direction of the printing sheet P. Further, the liquid discharge heads 8 are positioned without their centers overlapping in the conveyance direction of the printing sheet P.

The plurality of liquid discharge heads 8 positioned in one frame 7 form a head group 8A. Four head groups 8A are positioned along the conveyance direction of the printing sheet P. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling each of the head groups 8A to discharge the plurality of colors of ink onto the printing sheet P.

Note that a surface treatment may be performed on the printing sheet P, by discharging a coating agent from the liquid discharge heads 8 onto the printing sheet P.

Furthermore, the number of the liquid discharge heads 8 included in one head group 8A and the number of the head groups 8A provided in the printer 1 can be changed as appropriate in accordance with printing targets and printing conditions. For example, if the color to be printed on the printing sheet P is a single color and the range of the printing can be covered by a single liquid discharge head 8, only a single liquid discharge head 8 may be provided in the printer 1.

The printing sheet P thus subjected to the printing process inside the head case 5 is conveyed by the conveying rollers 9 to the outside of the head case 5, and passes through the inside of the dryer 10. The dryer 10 dries the printing sheet P after the printing process. The printing sheet P thus dried by the dryer 10 is conveyed by the conveying rollers 11 and then collected by the collection roller 13.

In the printer 1, by drying the printing sheet P with the dryer 10, it is possible to suppress bonding between the printing sheets P rolled while being overlapped with each other, and rubbing between undried liquid at the collection roller 13.

The sensor 12 includes a position sensor, a speed sensor, a temperature sensor, and the like. Based on information from the sensor 12, the controller 14 can determine the state of each part of the printer 1 and control each part of the printer 1.

In the printer 1 described above, the printing sheet P is the printing target (i.e., the recording medium), but the printing target in the printer 1 is not limited to the printing sheet P, and a roll type fabric or the like may be the printing target.

Furthermore, instead of directly conveying the printing paper P, the printer 1 may have a configuration in which the printing sheet P is put on a conveyor belt and conveyed. By using the conveyor belt, the printer 1 can perform printing on a sheet of paper, a cut cloth, wood, a tile, or the like as a printing target.

Furthermore, the printer 1 may discharge a liquid containing electrically conductive particles from the liquid discharge heads 8, to print a wiring pattern or the like of an electronic device. Furthermore, the printer 1 may discharge liquid containing a predetermined amount of liquid chemical agent or liquid containing the chemical agent from the liquid discharge heads 8 onto a reaction vessel or the like to produce chemicals.

The printer 1 may also include a cleaner for cleaning the liquid discharge heads 8. The cleaner cleans the liquid discharge heads 8 by, for example, a wiping process or a capping process.

The wiping process is, for example, a process of using a flexible wiper to rub a second surface 21*b* (see FIG. 6) of a channel member 21 (see FIG. 3), which is an example of a surface of a portion from which a liquid is discharged, thereby removing the liquid attached to the second surface 21*b*.

The capping process is performed as follows, for example. First, a cap is provided so as to cover the second surface 21*b* of the channel member 21 which is an example of the portion from which the liquid is discharged (this action is referred to as capping). This action forms a substantially sealed space between the second surface 21*b* and the cap.

The discharge of liquid is then repeated in such a sealed space. Consequently, it is possible to remove a liquid having a viscosity higher than that in the normal state, foreign matter, or the like that has clogged a discharge hole 63 (see FIG. 4).

Configuration of Liquid Discharge Head

Figure 3:
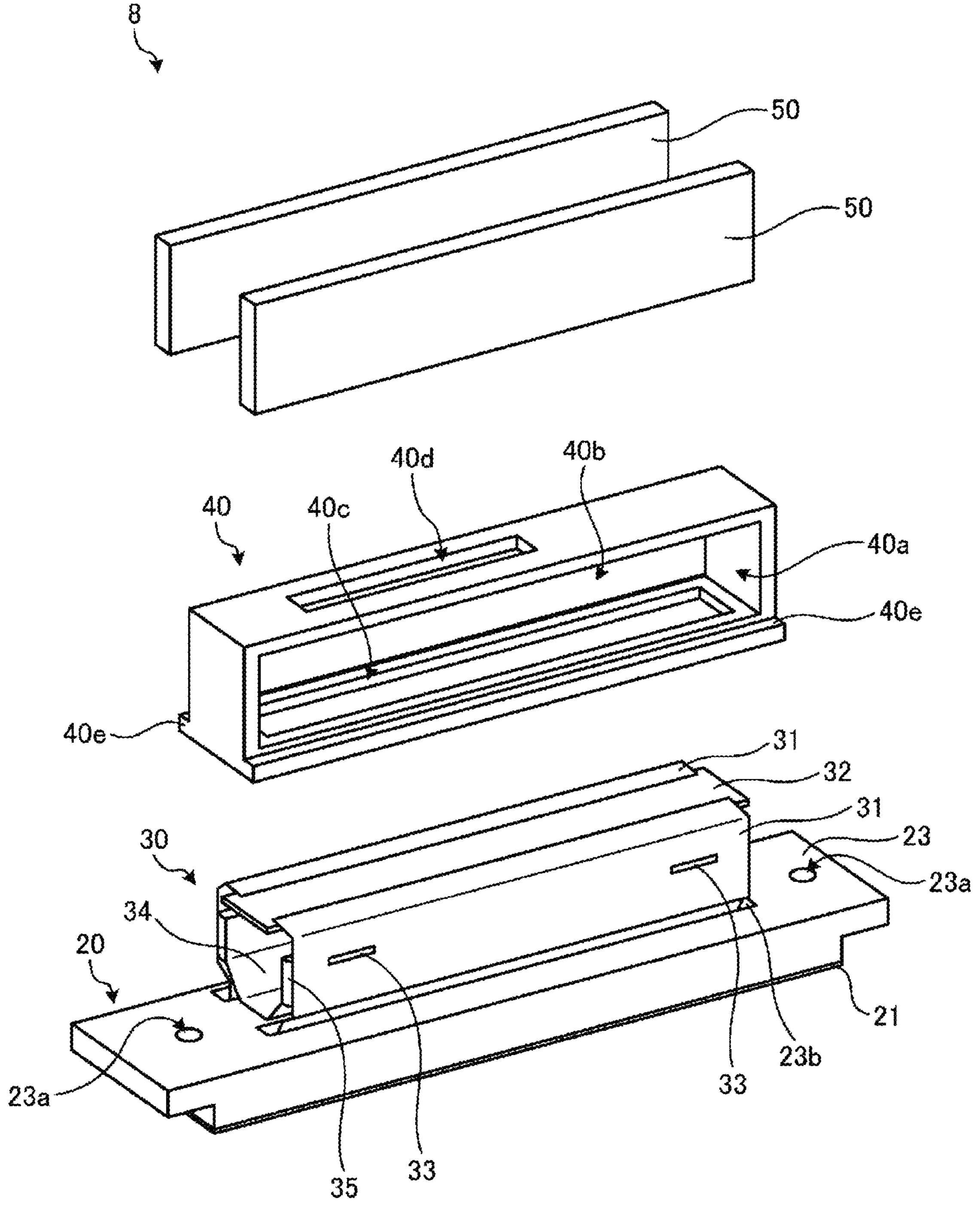
FIG. 3 is an exploded perspective view illustrating a schematic configuration of a liquid discharge head according to the embodiment.

Next, the configuration of the liquid discharge head 8 according to the embodiment will be described with reference to FIG. 3. FIG. 3 is an exploded perspective view illustrating a schematic configuration of the liquid discharge head 8 according to the embodiment.

The liquid discharge head 8 includes a head body 20, a wiring portion 30, a housing 40, and a pair of heat dissipation plates 50. The head body 20 includes the channel member 21, a piezoelectric actuator substrate 22 (see FIG. 4), and a reservoir 23.

Note that, in the following description, for the purpose of convenience, a direction in which the head body 20 is provided in the liquid discharge head 8 is referred to as "downward," and a direction in which the housing 40 is provided relative to the head body 20 is referred to as "upward".

The channel member 21 of the head body 20 has a substantially flat plate shape, and includes a first surface 21*a* (see FIG. 6), which is one main surface, and the second surface 21*b* (see FIG. 6) located at an opposite side from the first surface 21*a*. The first surface 21*a* has an opening 61*a* (see FIG. 4), and a liquid is supplied into the channel member 21 from the reservoir 23 through the opening 61*a*.

A plurality of the discharge holes 63 (see FIG. 4) used to discharge a liquid onto the printing sheet P are located at the second surface 21*b*. Furthermore, a channel through which a liquid flows from the first surface 21*a* to the second surface 21*b* is formed inside the channel member 21. Details of the channel member 21 will be described later.

The piezoelectric actuator substrate 22 is located on the first surface 21*a* of the channel member 21. The piezoelectric actuator substrate 22 includes a plurality of displacement elements 70 (see FIG. 5). In addition, the piezoelectric actuator substrate 22 is electrically connected to the flexible substrate 31 of the wiring portion 30. The piezoelectric actuator substrate 22 will be described in detail later.

The reservoir 23 is disposed on the piezoelectric actuator substrate 22. The reservoir 23 includes an opening 23*a* at both end portions thereof in the main scanning direction. The reservoir 23 has a channel therein, and is supplied with a liquid from the outside through the opening 23*a*. The reservoir 23 has a function of supplying the liquid to the channel member 21 and a function of storing the liquid to be supplied.

The wiring portion 30 includes the flexible substrate 31, a wiring board 32, a plurality of driver ICs 33, a pressing member 34, and an elastic member 35. The flexible substrate 31 has a function of transferring a predetermined signal sent from the outside to the head body 20. Note that, as illustrated in FIG. 3, the liquid discharge head 8 according to the embodiment includes two flexible substrates 31.

Each of the flexible substrates 31 has one end portion electrically connected to the piezoelectric actuator substrate 22 of the head body 20. The other end portion of the flexible substrate 31 is drawn upward so as to be inserted into an opening 23*b* of the reservoir 23, and is electrically connected to the wiring board 32.

This enables the piezoelectric actuator substrate 22 of the head body 20 and the outside to be electrically connected. Details of the flexible substrate 31 will be described later.

The wiring board 32 is located above the head body 20. The wiring board 32 has a function of distributing a signal to the plurality of driver ICs 33.

The plurality of driver ICs 33 are provided at one main surface of the flexible substrate 31. As illustrated in FIG. 3, in the liquid discharge head 8 according to the embodiment, two driver ICs 33 are provided on each flexible substrate 31. Note that, in the embodiment, the number of driver ICs 33 provided on each flexible substrate 31 is not limited to two.

The driver IC 33 drives the piezoelectric actuator substrate 22 of the head body 20 on the basis of a signal transmitted from the controller 14 (see FIG. 1). With this configuration, the driver IC 33 drives the liquid discharge head 8.

The pressing member 34 has a substantially U-shape in a cross-sectional view, and is configured to press the driver ICs 33 on the flexible substrate 31 toward the heat dissipation plate 50 from the inner side. With this configuration, the embodiment enables heat generated when the driver IC 33 drives to be efficiently dissipated to the heat dissipation plate 50 on the outer side.

The elastic member 35 is disposed so as to be in contact with an outer wall of a pressing portion, which is not illustrated, of the pressing member 34. With the elastic member 35 being provided, it is possible to reduce the likelihood of the pressing member 34 causing breakage of the flexible substrate 31 at the time when the pressing member 34 presses the driver ICs 33.

The elastic member 35 is made of, for example, double-sided foam tape or the like. In addition, for example, by using a non-silicon-based thermal conductive sheet for the elastic member 35, it is possible to improve the heat dissipating property of the driver IC 33. Note that the elastic member 35 does not necessarily have to be provided.

The housing 40 is disposed on the head body 20 so as to cover the wiring portion 30. This enables the wiring portion 30 to be sealed with the housing 40. The housing 40 is made of, for example, a resin or a metal or the like.

The housing 40 has a box shape elongated in the main scanning direction, and includes a first opening 40*a* and a second opening 40*b* at side surfaces opposed in the sub scanning direction. The first opening 40*a* and the second opening 40*b* are examples of an opening. In addition, the housing 40 includes a third opening 40*c* at a lower surface, and includes a fourth opening 40*d* at an upper surface.

One of the heat dissipation plates 50 is disposed on the first opening 40*a* so as to close the first opening 40*a*. The other of the heat dissipation plates 50 is disposed on the second opening 40*b* so as to close the second opening 40*b*.

The heat dissipation plates 50 are provided so as to extend in the main scanning direction, and are made of a metal, an alloy, or the like having a high heat dissipating property. The heat dissipation plates 50 are provided so as to be in contact with the driver ICs 33, and have a function of dissipating heat generated by the driver ICs 33.

The pair of heat dissipation plates 50 are each fixed to the housing 40 with a screw that is not illustrated. Thus, the housing 40 to which the heat dissipation plates 50 are fixed has a box shape in which the first opening 40*a* and the second opening 40*b* are closed and the third opening 40*c* and the fourth opening 40*d* are open.

The third opening 40*c* is provided so as to be opposed to the reservoir 23. The flexible substrate 31 and the pressing member 34 are inserted into the third opening 40*c*.

The fourth opening 40*d* is provided in order to insert a connector (not illustrated) provided on the wiring board 32. It is preferable that a portion between the connector and the fourth opening 40*d* be sealed using resin or the like. This makes it possible to suppress entry of a liquid, dust, or the like into the housing 40.

Furthermore, the housing 40 includes thermal insulation portions 40*e*. The thermal insulation portions 40*e* are respectively provided so as to be adjacent to the first opening 40*a* and the second opening 40*b*, and are provided so as to protrude outward from side surfaces of the housing 40 that are opposed to each other in the sub scanning direction.

In addition, the thermal insulation portions 40*e* are formed so as to extend in the main scanning direction. That is, the thermal insulation portions 40*e* are located between the heat dissipation plates 50 and the head body 20. By providing the housing 40 with the thermal insulation portions 40*e* in this manner, it is possible to suppress transfer of heat generated by the driver ICs 33 through the heat dissipation plates 50 to the head body 20.

Note that the liquid discharge head 8 may further include a member other than the member illustrated in FIG. 3.

Configuration of Head Body

Figure 4:
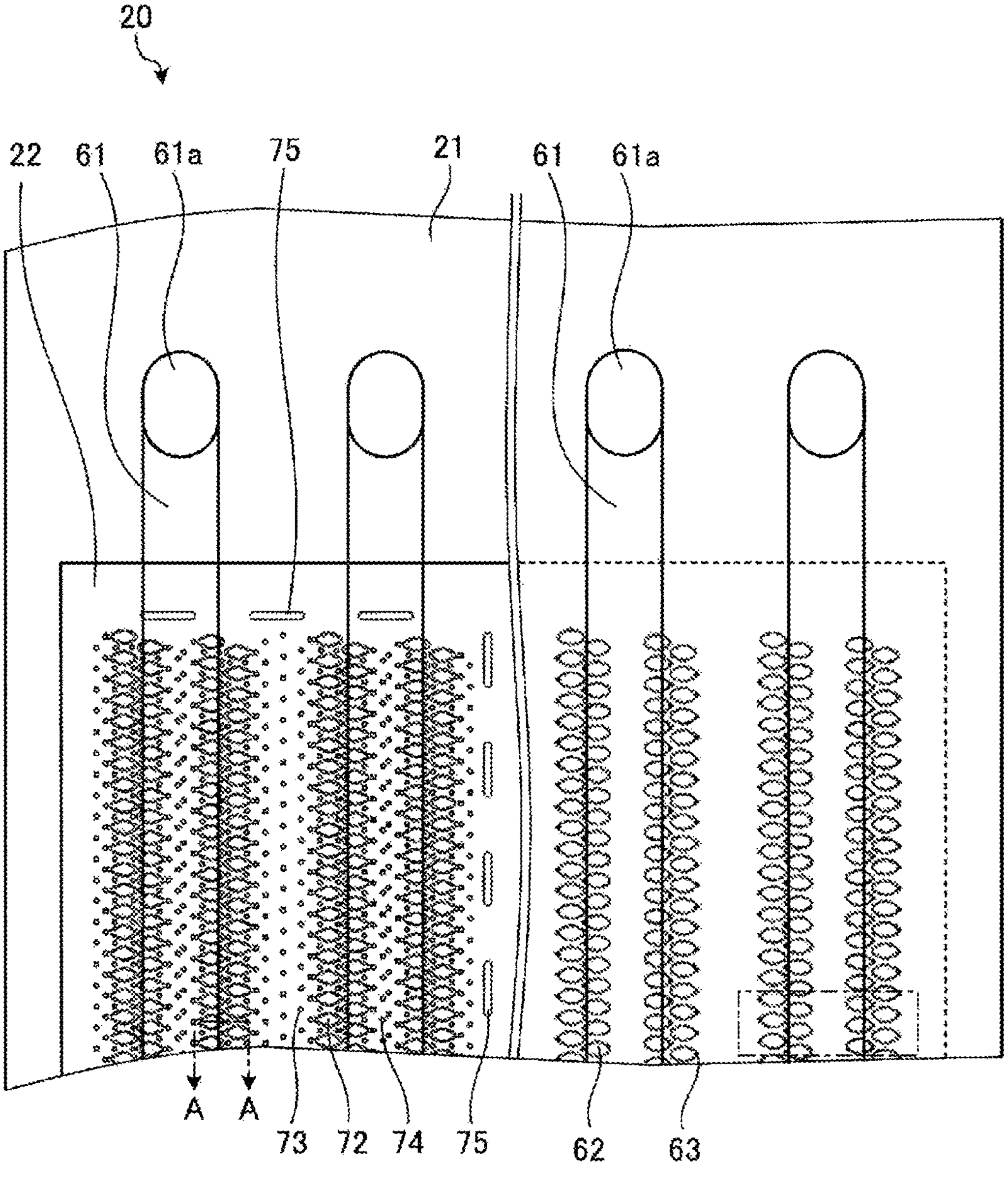
FIG. 4 is an enlarged plan view of the liquid discharge head illustrated in FIG. 3.
Figure 5:
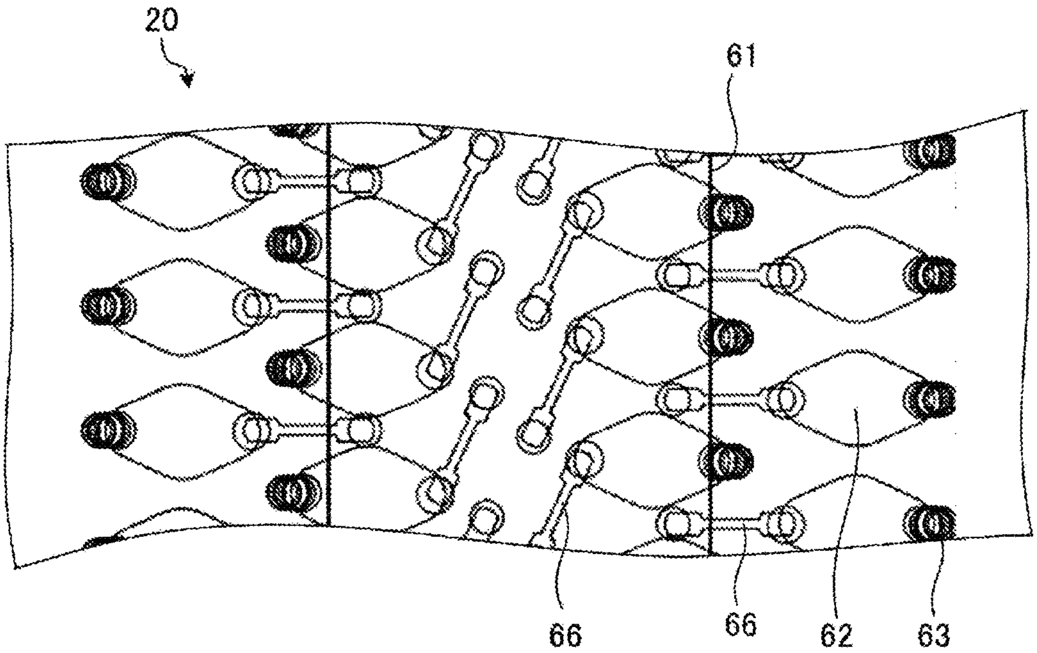
FIG. 5 is an enlarged view of a region in the dot-dash line in FIG. 4.
Figure 6:
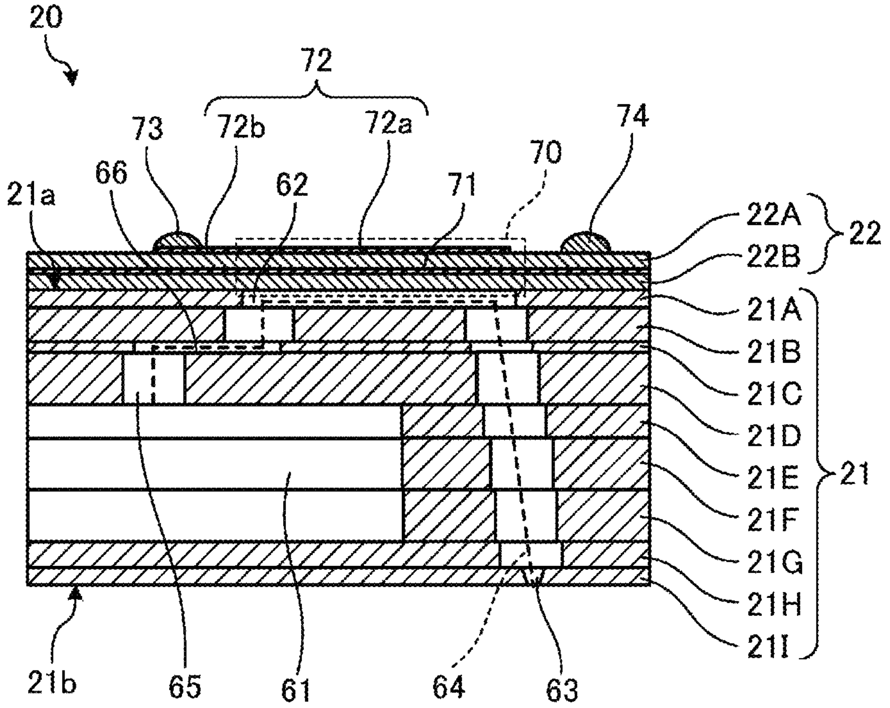
FIG. 6 is a cross-sectional view taken along line A-A in FIG. 4.

Next, the configuration of the head body 20 according to the embodiment will be described with reference to FIGS. 4 to 6. FIG. 4 is an enlarged plan view of the head body 20 according to the embodiment. FIG. 5 is an enlarged view of a region surrounded by a dot-dash line illustrated in FIG. 4. FIG. 6 is a cross-sectional view taken along line A-A in FIG. 4.

As illustrated in FIG. 4, the head body 20 includes the channel member 21 and the piezoelectric actuator substrate 22. The channel member 21 includes a supply manifold 61, a plurality of pressurizing chambers 62, and a plurality of discharge holes 63.

The plurality of pressurizing chambers 62 are connected to the supply manifold 61. The plurality of discharge holes 63 are each connected to corresponding one of the plurality of pressurizing chambers 62.

Each of the pressurizing chambers 62 opens to the first surface 21*a* (see FIG. 6) of the channel member 21. Furthermore, the first surface 21*a* of the channel member 21 has an opening 61*a* that communicates with the supply manifold 61. In addition, a liquid is supplied from the reservoir 23 (see FIG. 2) through the opening 61*a* to the inside of the channel member 21.

In the example illustrated in FIG. 4, the head body 20 has four supply manifolds 61 located inside the channel member 21. Each of the supply manifolds 61 has a long thin shape extending along the longitudinal direction (that is, in the main scanning direction) of the channel member 21. At both ends of the supply manifold 61, the opening 61*a* of the supply manifold 61 is formed on the first surface 21*a* of the channel member 21.

In the channel member 21, a plurality of pressurizing chambers 62 are formed so as to expand two-dimensionally. As illustrated in FIG. 5, each of the pressurizing chambers 62 is a hollow region having a substantially diamond planar shape with corner portions being rounded. The pressurizing chamber 62 is open at the first surface 21*a* of the channel member 21, and is closed by the piezoelectric actuator substrate 22 being bonded to this first surface 21*a*.

The pressurizing chambers 62 form a pressurizing chamber row arrayed in the longitudinal direction. The pressurizing chambers 62 in two adjacent pressurizing chamber rows are arranged in a staggered manner between the two pressurizing chamber rows. In addition, one pressurizing chamber group includes four pressurizing chamber rows connected to one supply manifold 61. In the example illustrated in FIG. 4, the channel member 21 includes four pressurizing chamber groups.

Furthermore, relative arrangements of the pressurizing chambers 62 within individual pressurizing chamber groups are configured in the same manner, and the pressurizing chamber groups are arranged in a manner such that they are slightly shifted from each other in the longitudinal direction.

The discharge holes 63 are disposed at positions of the channel member 21 other than a region that is opposed to the supply manifold 61. That is, the discharge holes 63 do not overlap with the supply manifold 61 in a transparent view of the channel member 21 from the first surface 21*a* side.

Furthermore, in a plan view, the discharge holes 63 are disposed within a region in which the piezoelectric actuator substrate 22 is mounted. One group of such discharge holes 63 occupies a region having approximately the same size and shape as the piezoelectric actuator substrate 22.

Then, the displacement element 70 (see FIG. 6) of a corresponding piezoelectric actuator substrate 22 is caused to be displaced, thereby discharging droplets from the discharge hole 63.

As illustrated in FIG. 6, the channel member 21 has a layered structure in which a plurality of plates are layered. These plates include a cavity plate 21A, a base plate 21B, an aperture plate 21C, a supply plate 21D, manifold plates 21E, 21F, and 21G, a cover plate 21H, and a nozzle plate 21I arranged in this order from the upper surface of the channel member 21.

A large number of holes are formed in these plates. The thickness of each of the plates is approximately 10 μm to approximately 300 μm. With this configuration, the holes can be formed with high accuracy. The individual plates are layered while aligned with respect to each other such that these holes communicate with each other to form a predetermined channel.

In the channel member 21, the supply manifold 61 and the discharge hole 63 communicate through an individual channel 64. The supply manifold 61 is located on the second surface 21*b* side within the channel member 21, and the discharge hole 63 is located at the second surface 21*b* of the channel member 21.

The individual channel 64 includes a pressurizing chamber 62 and an individual supply channel 65. The pressurizing chamber 62 is located at the first surface 21*a* of the channel member 21. The individual supply channel 65 serves as a channel that connects the supply manifold 61 and the pressurizing chamber 62.

In addition, the individual supply channel 65 includes a reduction portion 66 having a width narrower than other portions. The reduction portion 66 has a width narrower than other portions of the individual supply channel 65, and hence, has a high channel resistance. In this manner, when the channel resistance of the reduction portion 66 is high, pressure occurring at the pressurizing chamber 62 is less likely to escape to the supply manifold 61.

The piezoelectric actuator substrate 22 includes piezoelectric ceramic layers 22A and 22B, a common electrode 71, an individual electrode 72, a connecting electrode 73, a dummy connecting electrode 74, and a front surface electrode 75 (see FIG. 4).

The piezoelectric actuator substrate 22 has the piezoelectric ceramic layer 22A, the common electrode 71, the piezoelectric ceramic layer 22B, and the individual electrode 72 layered in this order.

Both of the piezoelectric ceramic layers 22A and 22B each extend over the first surface 21*a* of the channel member 21 so as to extend across the plurality of pressurizing chambers 62. The piezoelectric ceramic layers 22A and 22B each have a thickness of approximately 20 μm. For example, the piezoelectric ceramic layers 22A and 22B are made of a lead zirconate titanate (PZT)-based ceramic material having ferroelectricity.

The common electrode 71 is formed over substantially the entire surface in a surface direction of a region between the piezoelectric ceramic layer 22A and the piezoelectric ceramic layer 22B. That is, the common electrode 71 overlaps with all the pressurizing chambers 62 in the region that is opposed to the piezoelectric actuator substrate 22.

The thickness of the common electrode 71 is approximately 2 μm. For example, the common electrode 71 is made of a metal material such as a Ag—Pd based material.

The individual electrode 72 includes a body electrode 72*a* and an extraction electrode 72*b*. The body electrode 72*a* is located in a region of the piezoelectric ceramic layer 22B that is opposed to the pressurizing chamber 62. The body electrode 72*a* is slightly smaller than the pressurizing chamber 62, and has a shape substantially similar to that of the pressurizing chamber 62.

The extraction electrode 72*b* is drawn out from the body electrode 72*a* to be outside the region that is opposed to the pressurizing chamber 62. The individual electrode 72 is made of, for example, a metal material such as a Au-based material.

The connecting electrode 73 is located on the extraction electrode 72*b*, and is formed to have a convex shape with a thickness of approximately 15 μm. The connecting electrode 73 is electrically connected to an electrode provided at the flexible substrate 31 (see FIG. 3). The connecting electrode 73 is made of, for example, silver-palladium, including glass frit.

The dummy connecting electrode 74 is located on the piezoelectric ceramic layer 22B and is positioned so as not to overlap with various electrodes such as the individual electrode 72. The dummy connecting electrode 74 connects the piezoelectric actuator substrate 22 and the flexible substrate 31, and increases the connection strength.

Furthermore, the dummy connecting electrode 74 makes uniform the distribution of the contact positions between the piezoelectric actuator substrate 22 and the piezoelectric actuator substrate 22, and stabilizes the electrical connection. The dummy connecting electrode 74 is preferably made of a material equivalent to that of the connecting electrode 73, and is preferably formed in a process equivalent to that of the connecting electrode 73.

The front surface electrode 75 illustrated in FIG. 4 is formed on the piezoelectric ceramic layer 22B and at a position that does not interfere with the individual electrode 72. The front surface electrode 75 is connected to the common electrode 71 through a via hole formed in the piezoelectric ceramic layer 22B.

With this configuration, the front surface electrode 75 is grounded and maintained at the ground electric potential. The front surface electrode 75 is preferably made of a material equivalent to that of the individual electrode 72, and is preferably formed in a process equivalent to that of the individual electrode 72.

A plurality of the individual electrodes 72 are individually electrically connected to the controller 14 (see FIG. 1) via the flexible substrate 31 and wirings, in order to individually control the electric potential. By setting the individual electrode 72 and the common electrode 71 to have different electric potentials, and applying an electric field in the polarization direction of the piezoelectric ceramic layers 22A, the portion of the piezoelectric ceramic layer 22A to which the electric field is applied operates as an activation section distorted due to a piezoelectric effect.

In other words, in the piezoelectric actuator substrate 22, portions of the individual electrode 72, the piezoelectric ceramic layer 22A, and the common electrode 71 that are opposed to the pressurizing chamber 62 function as the displacement element 70.

In addition, unimorph deformation of the displacement element 70 results in the pressurizing chamber 62 being pressed and a liquid being discharged from the discharge hole 63.

Next, a drive procedure of the liquid discharge head 8 according to the embodiment will be described. The individual electrode 72 is set to be a higher electric potential (hereinafter, also referred to as a high electric potential) than the common electrode 71 in advance. Then, each time a discharge request is made, the individual electrode 72 is once set to be the same electric potential (hereinafter, referred as a "low electric potential") as the common electrode 71, and then is again set to the high electric potential at a predetermined timing.

With this configuration, at the timing when the individual electrode 72 changes to the low electric potential, the piezoelectric ceramic layers 22A and 22B return to their original shapes, and the volume of the pressurizing chamber 62 increases to be higher than the initial state, that is, higher than the state of the high electric potential.

At this time, negative pressure is applied to the inside of the pressurizing chamber 62. Thus, a liquid in the supply manifold 61 is sucked into the interior of the pressurizing chamber 62.

After this, the piezoelectric ceramic layers 22A and 22B deform so as to protrude toward the pressurizing chamber 62 at the timing when the individual electrode 72 is again set to the high electric potential.

In other words, the inside of the pressurizing chamber 62 has a positive pressure as a result of a reduction in the volume of the pressurizing chamber 62. Thus, the pressure of the liquid within the pressurizing chamber 62 rises, and droplets are discharged from the discharge hole 63.

In other words, in order to discharge droplets from the discharge hole 63, the controller 14 supplies a drive signal including pulses based on the high electric potential to the individual electrode 72 using the driver IC 33. It is only necessary to set the pulse width to an acoustic length (AL) that is a length of time when a pressure wave propagates from the reduction portion 66 to the discharge hole 63.

With this configuration, when the inside of the pressurizing chamber 62 changes from the negative pressure state to the positive pressure state, the pressures under both of the states are combined, which makes it possible to discharge the droplets with higher pressure.

In addition, in a case of gray scale printing, the gray scale is expressed based on the number of droplets continuously discharged from the discharge hole 63, that is, the amount (volume) of droplets adjusted based on the number of times the droplets are discharged. Thus, the droplets are discharged a number of times corresponding to the designated gray scale to be expressed, through the discharge hole 63 corresponding to the designated dot region.

In general, when the liquid discharge is continuously performed, an interval between the pulses that are supplied to discharge the droplets may be set to the AL. Due to this, a period of a residual pressure wave of pressure generated in discharging the droplets discharged earlier matches a period of a pressure wave of pressure to be generated in discharging droplets to be discharged later.

Thus, the residual pressure wave and the pressure wave are superimposed, whereby the droplets can be discharged with a higher pressure. Note that in this case, the speed of the droplets to be discharged later is increased, and the impact points of the plurality of droplets become close.

Details of Flexible Substrate

Figure 7:
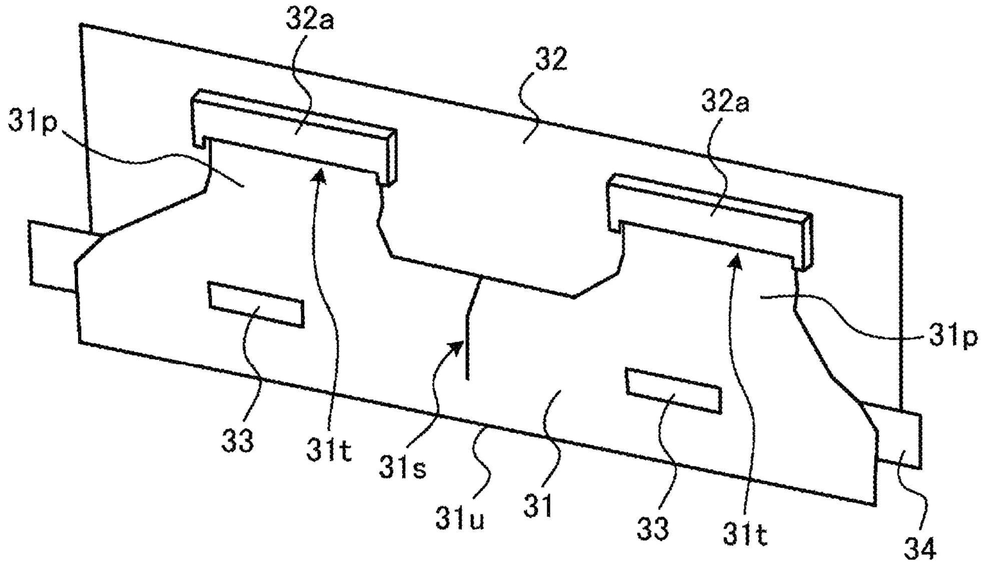
FIG. 7 is a perspective view used to explain a structure of a flexible substrate according to the embodiment and the vicinity of the flexible substrate.

Next, details of the flexible substrate 31 according to the embodiment will be described with reference to FIGS. 7 to 10. FIG. 7 is a perspective view used to explain the structure of the flexible substrate 31 according to the embodiment and the vicinity of the flexible substrate 31. Note that a wiring layer 31*b* (see FIG. 8) formed within the flexible substrate 31 or various types of elements on the wiring board 32 or the like are not illustrated in FIG. 7.

The flexible substrate 31 has a shape that gradually bifurcates and tapers toward the upper direction. That is, the flexible substrate 31 includes two protruding portions 31*p* each protruding upward. In addition, the flexible substrate 31 includes a lower portion 31*u* electrically connected to the piezoelectric actuator substrate 22 (see FIG. 3) of the head body 20 (see FIG. 3).

In addition, the tip portion of the protruding portion 31*p* of the flexible substrate 31 that serves as a connector insertion portion 31*t* is inserted into a connector 32*a* provided at the wiring board 32. Furthermore, inserting the connector insertion portion 31*t* inserted into the connector 32*a* allows the flexible substrate 31 and the wiring board 32 to be electrically connected.

The plurality of driver ICs 33 are mounted at a position lower than each of the plurality of connector insertion portions 31*t* of the flexible substrate 31. The pressing member 34 is provided at a side of the flexible substrate 31 opposite from a side where the driver ICs 33 are mounted. In addition, the pressing member 34 is used to press the driver ICs 33 from the inner side toward the heat dissipation plate 50 (see FIG. 3). Note that the position where the driver ICs 33 are mounted is not limited to the position lower than the connector insertion portion 31*t*.

In addition, a slit 31*s* is formed between the protruding portions 31*p* adjacent to each other at the flexible substrate 31. Details of this slit 31*s* will be described later.

Figure 8:
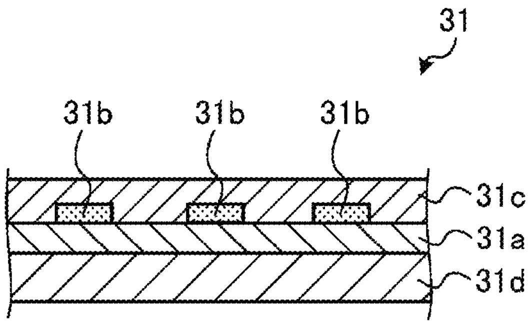
FIG. 8 is a schematic view illustrating a cross-section of a connector insertion portion of the flexible substrate according to the embodiment and its surroundings.

FIG. 8 is a schematic view of a cross-section at or around the connector insertion portion 31*t* of the flexible substrate 31 according to the embodiment. At or around the connector insertion portion 31*t*, the flexible substrate 31 includes a base substrate 31*a*, the wiring layer 31*b*, a cover layer 31*c*, and a reinforcing plate 31*d*.

The base substrate 31*a* is composed of an insulation body (for example, a resin material or the like) having flexibility. The wiring layer 31*b* is formed at a front surface of the base substrate 31*a*, and is composed of an electroconductive body (for example, a metal or the like). With this wiring layer 31*b*, a desired wiring pattern is formed at the flexible substrate 31.

The cover layer 31*c* is formed at a front surface of the base substrate 31*a* so as to cover the wiring layer 31*b*. The cover layer 31*c* is provided to protect the wiring layer 31*b*.

The reinforcing plate 31*d* is a member for reinforcing the vicinity of the connector insertion portion 31*t* at the flexible substrate 31. The reinforcing plate 31*d* is disposed at a back surface of the base substrate 31*a*, and is made out, for example, of resin such as glass epoxy, composite, polyetherimide, polyimide, or polyester; or a metal such as stainless steel, aluminum, or an alloy thereof.

Figure 9:
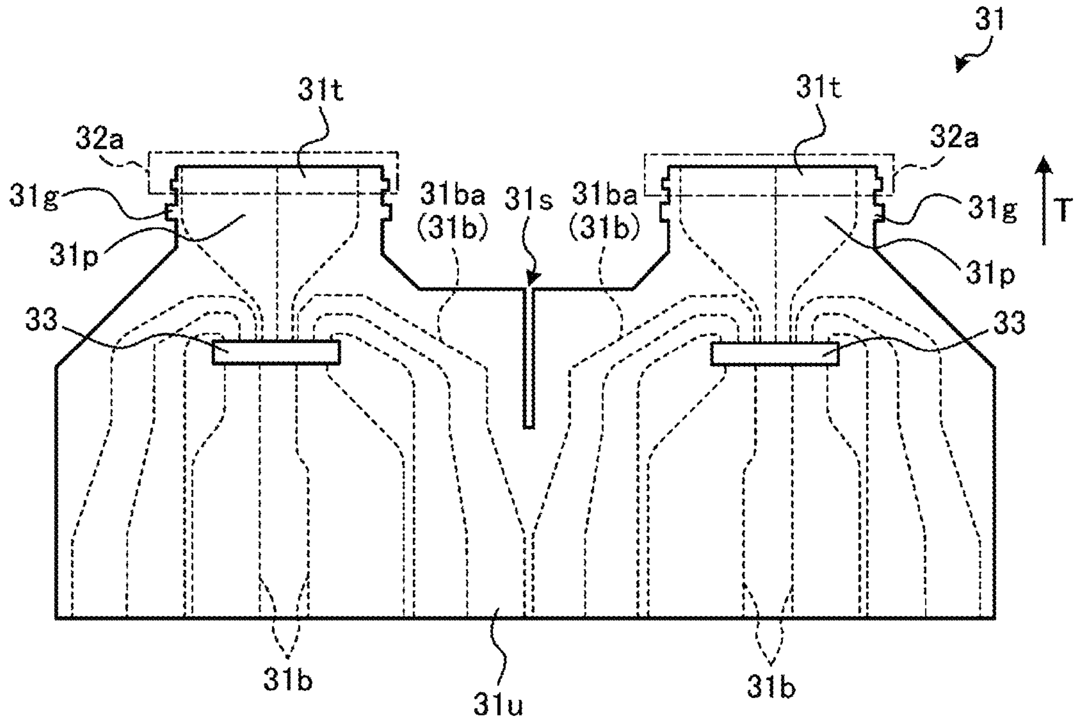
FIG. 9 is a diagram used to explain the entire configuration of the flexible substrate according to the embodiment.

FIG. 9 is a diagram used to explain the entire configuration of the flexible substrate 31 according to the embodiment. Note that, in FIG. 9, positions of the corresponding connectors 32*a* are illustrated with the long dashed short dashed lines.

As illustrated in FIG. 9, the flexible substrate 31 includes a plurality of (two in FIG. 9) the protruding portions 31*p* configured to protrude in the same direction. These protruding portions 31*p* protrude in an inserting direction T of the connector insertion portion 31*t*.

In addition, since the flexible substrate 31 has flexibility and the widths of the protruding portions 31*p* are configured to be reduced, the flexible substrate 31 has a shape that makes it easy to insert the connector insertion portions 31*t* into the connectors 32*a* at the time of insertion.

Furthermore, in the embodiment, the slit 31*s* is formed between protruding portions 31*p* adjacent to each other at the flexible substrate 31. Such a slit 31*s* is formed so as to extend from a side (the upper side in FIG. 9) from which the protruding portions 31*p* protrude at the flexible substrate 31 and in a direction (the downward direction in FIG. 9) opposite to the direction in which the protruding portions 31*p* protrude.

With this configuration, it is possible to easily deform not only the protruding portions 31*p* but also the vicinity of the slit 31*s* at the time of inserting the connector insertion portions 31*t* into the connectors 32*a*. Thus, the flexible substrate 31 according to the embodiment has a shape that makes it easy to insert the connector insertion portions 31*t* into the connectors 32*a* at the time of insertion.

Here, in the embodiment, the slit 31*s* extends up to a region between the driver ICs 33 adjacent to each other on the same main surface of the flexible substrate 31. That is, the slit 31*s* is formed so as to separate adjacent driver ICs 33 from each other.

With this configuration, it is possible to lengthen the heat transfer path from one driver IC 33 to another driver IC 33 at the flexible substrate 31. Thus, the embodiment makes it possible to reduce the thermal interference between the driver ICs 33 adjacent to each other.

Furthermore, in the embodiment, it is preferable that the slit 31*s* is formed at the center between protruding portions 31*p* adjacent to each other. If the slit 31*s* is formed at a decentered position between the protruding portions 31*p* adjacent to each other, the protruding portion 31*p* disposed closer to the slit 31*s* can be easily deformed to the vicinity of the slit 31*s*, whereas the protruding portion 31*p* disposed further away from the slit 31*s* is difficult to be deformed to the vicinity of the slit 31*s*.

However, in a case of the embodiment, the slit 31*s* is formed at the center between the protruding portions 31*p* adjacent to each other. This makes it possible to evenly deform both of the protruding portions 31*p* to the vicinity of the slip 31*s*. Thus, with the embodiment, it is possible to evenly insert the individual connector insertion portions 31*t*.

In addition, in the embodiment, it is preferable that a shank 31*g* that protrudes in the width direction of the protruding portion 31*p* is provided at a side portion of the protruding portion 31*p* adjacent to the connector insertion portion 31*t*. Note that, in the example in FIG. 9, two shanks 31*g* are provided at one side portion.

In the embodiment, by holding the shank 31*g* to insert the connector insertion portion 31*t* into the connector 32*a*, it is possible to more easily insert the connector insertion portion 31*t* into the connector 32*a*.

As illustrated in FIG. 9, a large number of the wiring layers 31*b* illustrated with the dashed lines are formed at the flexible substrate 31. Note that, for the purpose of facilitating understanding, the number of the wiring layers 31*b* are illustrated in FIG. 9 in a reduced manner.

For example, a plurality of the wiring layers 31*b* that extend toward the connector insertion portion 31*t* are formed from a center portion of the upper portion of the driver IC 33. In addition, a plurality of the wiring layers 31*b* that extend toward the lower portion 31*u* of the flexible substrate 31 are formed from the lower portion of the driver IC 33.

Furthermore, from portions other than the center portion of the upper portion of the driver IC 33, a plurality of the wiring layers 31*b* that extend toward the lower portion 31*u* of the flexible substrate 31 are formed in a diverted manner so as to avoid the driver IC 33.

In addition, a wiring layer 31*ba* that is the wiring layer 31*b* disposed closest to the slit 31*s* extends from the slit 31*s* side of the upper portion of the driver IC 33 so as to avoid the driver IC 33 and pass through the vicinity of the slit 31*s* toward the lower portion 31*u* of the flexible substrate 31.

Figure 10:
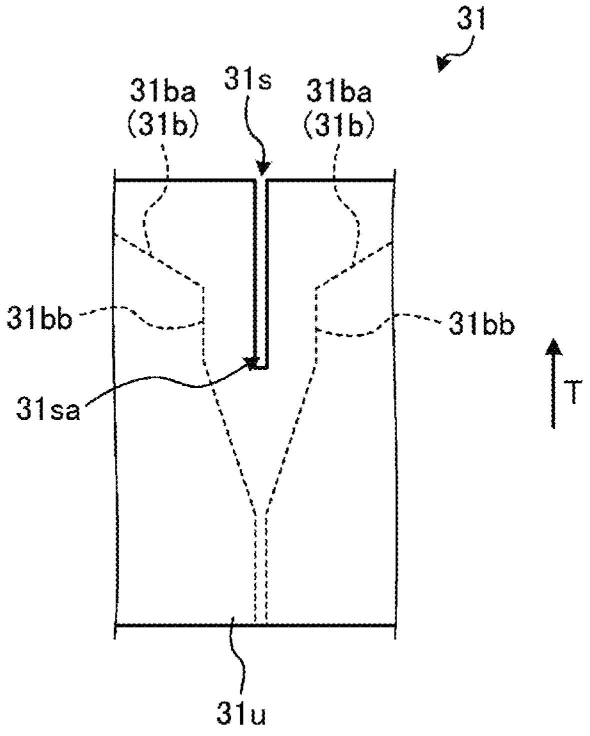
FIG. 10 is an enlarged view illustrating a configuration of the flexible substrate according to the embodiment.

FIG. 10 is an enlarged view illustrating the configuration of the flexible substrate 31 according to the embodiment, and is a diagram used to explain a positional relationship between the slit 31*s* and the wiring layer 31*ba* at the flexible substrate 31.

As illustrated in FIG. 10, in the embodiment, the width of the slit 31*s* is substantially equal throughout the entire region, and falls in a range, for example, of approximately 1 to 2 mm. In addition, the slit 31*s* extends so as to be along the inserting direction T of the connector insertion portion 31*t*.

In the embodiment, it is preferable that the width of the slit 31*s* is equal to or more than a predetermined value (for example, 1 mm). In a case where the width of the slit 31*s* is less than the predetermined value, flexible substrates 31 at both sides of the slit 31*s* are excessively close to each other when the vicinity of the slit 31*s* is deformed to insert the connector insertion portion 31*t*, which results in a possibility that these flexible substrates 31 at both sides are rubbed with each other.

However, in a case of the embodiment, since the width of the slit 31*s* is set to be equal to or more than the predetermined value, it is possible to suppress a failure occurring due to rubbing, with each other, of the flexible substrates 31 at both side of the slit 31*s*.

Furthermore, in the embodiment, it is preferable that the wiring layer 31*ba* of the flexible substrate 31 includes a portion 31*bb* extending along the slit 31*s*. With this configuration, it is possible to enhance the rigidity of the flexible substrate 31 in the vicinity of the slit 31*s*.

In addition, in the embodiment, it is preferable that the wiring layer 31*ba* of the flexible substrate 31 is disposed so as to surround a tip portion 31*sa* of the slit 31*s*. This makes it possible to enhance the rigidity of the vicinity of the tip portion 31*sa* of the slit 31*s* at the flexible substrate 31.

Thus, with the embodiment, it is possible to prevent the flexible substrate 31 from being torn when the vicinity of the slit 31*s* is deformed.

Furthermore, in the embodiment, the pressing member 34 is exposed from the slit 31*s* to the heat dissipation plate 50. For this reason, by bringing the pressing member 34 exposed from the slit 31*s* into direct contact with the heat dissipation plate 50, it is possible to favorably transfer, to the heat dissipation plate 50, the heat transferred from the driver IC 33 to the pressing member 34. Thus, with the embodiment, it is possible to favorably dissipate the heat generated from the driver IC 33.

Various Variations

Figure 11:
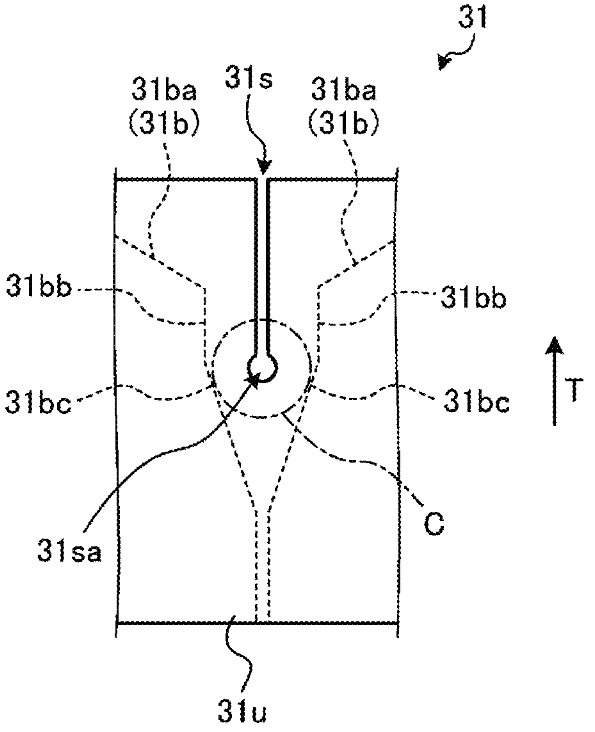
FIG. 11 is an enlarged view illustrating a configuration of a flexible substrate according to a first modification example of the embodiment.

Various modification examples of the flexible substrate 31 according to the embodiment will be described with reference to FIGS. 11 to 18. FIG. 11 is an enlarged view illustrating a configuration of the flexible substrate 31 according to a first modification example of the embodiment. Note that, in the various variations below, redundant explanations are omitted, with parts that are the same as those in the embodiment described above denoted by the same reference numerals.

As illustrated in FIG. 11, in the flexible substrate 31 according to the first modification example, the slit 31*s* has a shape differing from that in the embodiment. Specifically, the tip portion 31*sa* of the slit 31*s* according to the first modification example has a rounded shape.

In this manner, by making the tip portion 31*sa* of the slit 31*s* have a rounded shape, it is possible to disperse the stress acting on the tip portion 31*sa* of the slit 31*s* at the time when the vicinity of the slit 31*s* is deformed.

Thus, with the first modification example, it is possible to prevent the flexible substrate 31 from being torn at the time when the vicinity of the slit 31*s* is deformed. Note that the example in FIG. 11 gives an example in which the tip portion 31*sa* of the slit 31*s* has a circular shape. However, the shape of the tip portion 31*sa* is not limited to the circular shape, and may be an elliptical shape.

In addition, in the first modification example, it is preferable that the wiring layer 31*ba* of the flexible substrate 31 extends so as to be in contact with an imaginary circle C concentric with the rounded shape formed at the tip portion 31*sa* of the slit 31*s*. That is, in the first modification example, it is preferable that the wiring layer 31*ba* of the flexible substrate 31 has a portion 31*bc* that extends so as to be in contact with this imaginary circle C.

With this configuration, it is possible to lengthen the distance from the tip portion 31*sa* of the slit 31*s* to the wiring layer 31*ba*, which makes it possible to suppress a failure (for example, short circuit of the wiring layer 31*ba*) occurring as a result of the slit 31*s* and the wiring layer 31*ba* being close to each other.

Figure 12:
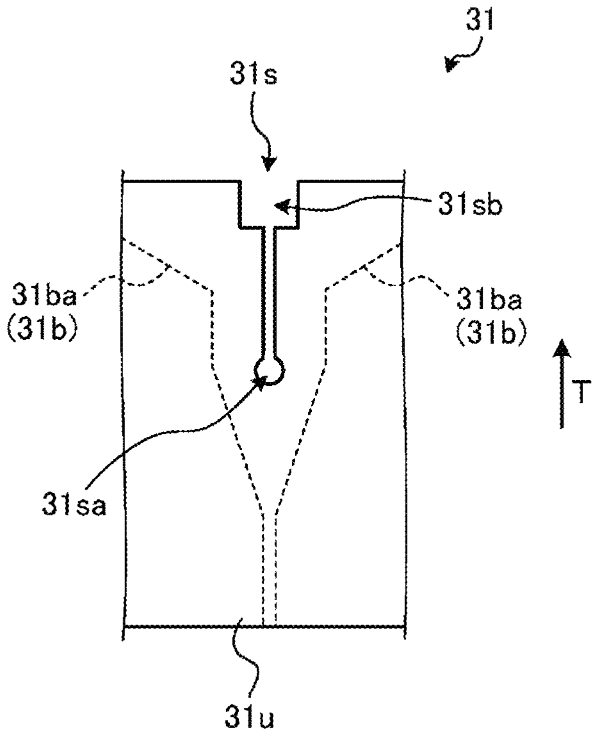
FIG. 12 is an enlarged view illustrating a configuration of a flexible substrate according to a second modification example of the embodiment.

FIG. 12 is an enlarged view illustrating the configuration of the flexible substrate 31 according to a second modification example of the embodiment. As illustrated in FIG. 12, the slit 31*s* according to the second modification example is configured such that the width of a base end portion 31*sb* is wider than the width of portions other than the base end portion 31*sb* and the tip portion 31*sa*.

With this configuration, at the time when the vicinity of the slit 31*s* is deformed, it is possible to prevent the flexible substrates 31 at both sides of the base end portion 31*sb* that is more largely deformed, from being rubbed with each other. Thus, with the second modification example, it is possible to suppress a failure occurring due to rubbing, with each other, of the flexible substrates 31 at both side of the base end portion 31*sb*.

Note that the example in FIG. 12 gives an example in which the width of the slit 31*s* changes stepwise from the base end portion 31*sb* toward the tip portion 31*sa*. However, the change in the width of the slit 31*s* is not limited to the stepwise manner.

Figure 13:
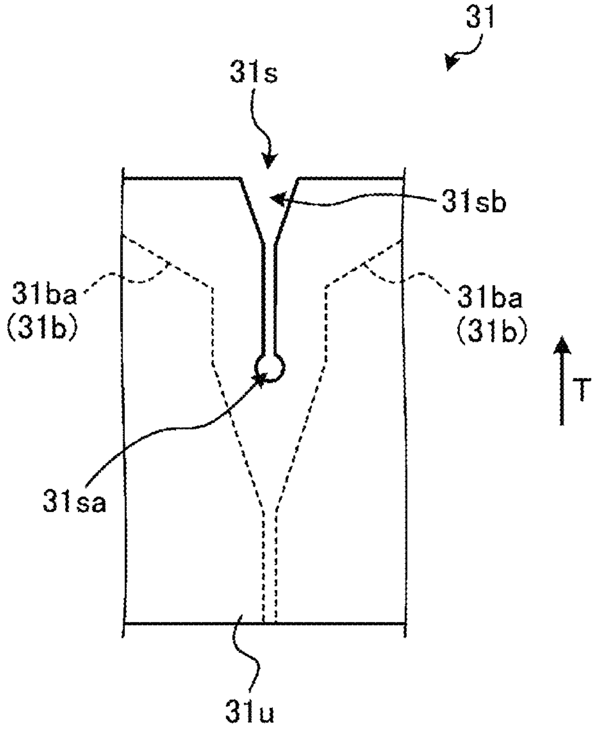
FIG. 13 is an enlarged view illustrating a configuration of a flexible substrate according to a third modification example of the embodiment.

FIG. 13 is an enlarged view illustrating the configuration of the flexible substrate 31 according to a third modification example of the embodiment. In the example in FIG. 13, the width of the slit 31*s* gradually reduces from the base end portion 31*sb* to a predetermined location, and the width of the slit 31*s* is substantially equal from the predetermined location to the vicinity of the tip portion 31*sa*.

Even with such a shape, at the time when the vicinity of the slit 31*s* is deformed, it is possible to prevent the flexible substrates 31 at both sides of the base end portion 31*sb* that is more largely deformed, from being rubbed with each other. Thus, with the third modification example, it is possible to suppress a failure occurring due to rubbing, with each other, of the flexible substrates 31 at both sides of the base end portion 31*sb*.

Furthermore, in the third modification example, all the internal angles of the slit 31*s* other than the tip portion 31*sa* can be each set to be an obtuse angle. This makes it possible to disperse the stress acting on the slit 31*s* at the time when the vicinity of the slit 31*s* is deformed.

Thus, with the third modification example, it is possible to prevent the flexible substrate 31 from being torn at the time when the vicinity of the slit 31*s* is deformed.

Figure 14:
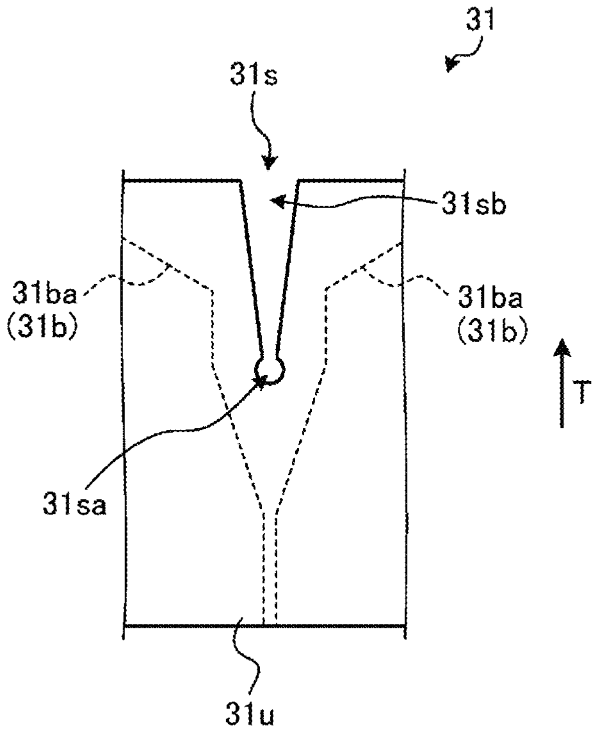
FIG. 14 is an enlarged view illustrating a configuration of a flexible substrate according to a fourth modification example of the embodiment.

FIG. 14 is an enlarged view illustrating the configuration of the flexible substrate 31 according to a fourth modification example of the embodiment. In the example in FIG. 14, the width of the slit 31*s* gradually reduces from the base end portion 31*sb* to the vicinity of the tip portion 31*sa*.

Even with such a shape, at the time when the vicinity of the slit 31*s* is deformed, it is possible to prevent the flexible substrates 31 at both sides of the base end portion 31*sb* that is more largely deformed, from being rubbed with each other. Thus, with the fourth modification example, it is possible to suppress a failure occurring due to rubbing, with each other, of the flexible substrates 31 at both sides of the base end portion 31*sb*.

In addition, in the fourth modification example, all the internal angles of the slit 31*s* other than the tip portion 31*sa* can be each set to be an obtuse angle. This makes it possible to disperse the stress acting on the slit 31*s* at the time when the vicinity of the slit 31*s* is deformed.

Thus, with the fourth modification example, it is possible to prevent the flexible substrate 31 from being torn at the time when the vicinity of the slit 31*s* is deformed.

Figure 15:
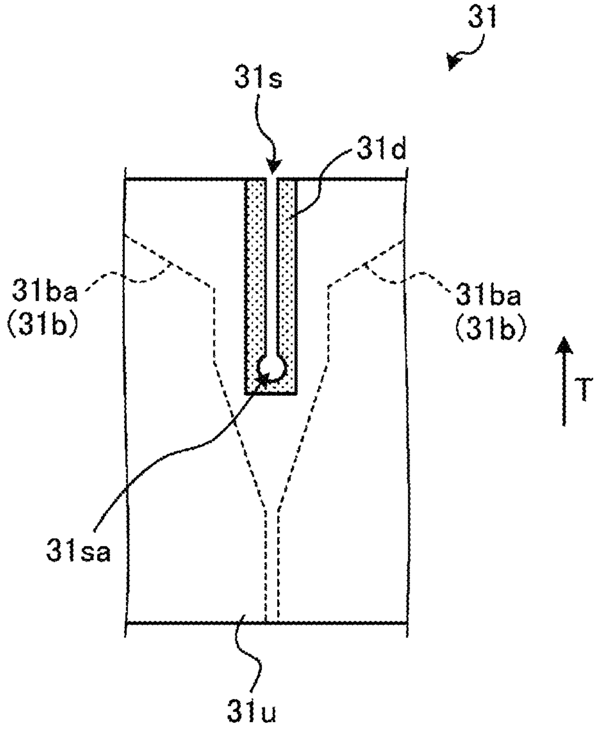
FIG. 15 is an enlarged view illustrating a configuration of a flexible substrate according to a fifth modification example of the embodiment.

FIG. 15 is an enlarged view illustrating the configuration of the flexible substrate 31 according to a fifth modification example of the embodiment. Note that, in FIG. 15, hatching is applied to a portion where the reinforcing plate 31*d* is provided in the vicinity of the slit 31*s*.

As illustrated in FIG. 15, the flexible substrate 31 according to the fifth modification example includes the reinforcing plate 31*d* at the periphery of the portion where the slit 31*s* extends. This makes it possible to prevent the flexible substrate 31 from being broken from the periphery of the portion where the slit 31*s* extends.

Furthermore, the flexible substrate 31 according to the fifth modification example includes the reinforcing plate 31*d* at the periphery of the tip portion 31*sa* of the slit 31*s*. This makes it possible to prevent the flexible substrate 31 from being broken from the periphery of the tip portion 31*sa* of the slit 31*s*.

Note that the example in FIG. 15 gives an example in which the reinforcing plate 31*d* is provided at both the periphery of the region where the slit 31*s* extends and the periphery of the tip portion 31*sa* of the slit 31*s*. However, it may be possible that the reinforcing plate 31*d* is provided only at either one of them.

In particular, by providing the reinforcing plate 31*d* only at the periphery of the tip portion 31*sa* of the slit 31*s*, it is possible to prevent breakage starting from the periphery of the tip portion 31*sa* of the slit 31*s* where stress is more likely to concentrate and the possibility of breakage is relatively high, and it is also possible to reduce the amount of usage of the reinforcing plate 31*d*.

In addition, in the fifth modification example, it is preferable that no wiring layer 31*b* is provided at a portion of the flexible substrate 31 where the reinforcing plate 31*d* is provided. This makes it possible to prevent the wiring layer 31*b* from being broken at the time when a portion of the flexible substrate 31 that corresponds to the slit 31*s* is stamped out together with the reinforcing plate 31*d* to form the slit 31*s*.

Figure 16:
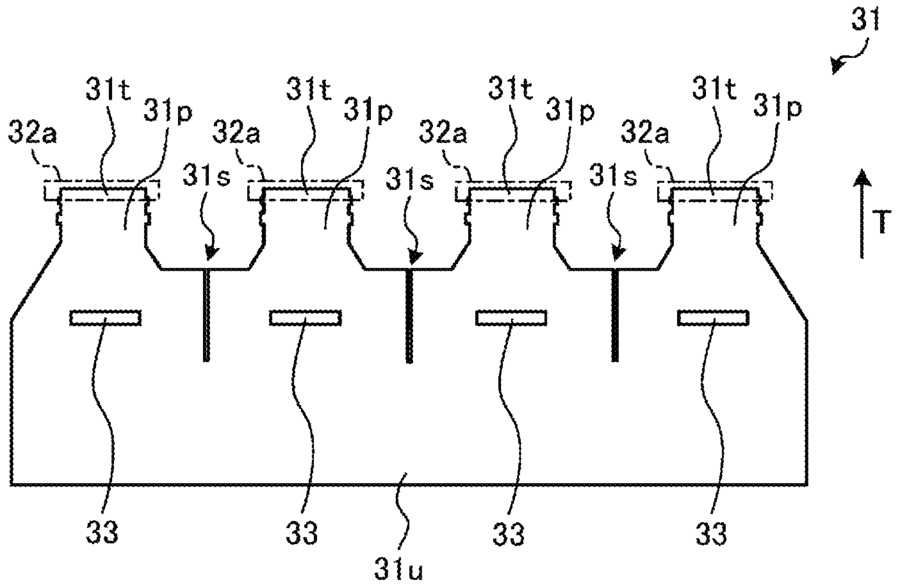
FIG. 16 is a diagram used to explain an entire configuration of a flexible substrate according to a sixth modification example of the embodiment.

FIG. 16 is a diagram used to explain the entire configuration of the flexible substrate 31 according to a sixth modification example of the embodiment. The embodiment illustrated in FIG. 9 or the like gives an example in which two protruding portions 31*p* are provided at one flexible substrate 31. However, the number of the protruding portions 31*p* provided at one flexible substrate 31 is not limited to two.

For example, in a case where the resolution of the liquid discharge head 8 is set to be high, more driver ICs 33 are necessary. Thus, there may be a case where the number of the protruding portions 31*p* needs to be equivalent to these driver ICs 33.

For example, as illustrated in FIG. 16, in a case where four driver ICs 33 are mounted to one flexible substrate 31, four protruding portions 31*p* that correspond to the four driver ICs 33 are formed.

In this manner, even in a case where three or more (four in FIG. 16) protruding portions 31*p* are formed at one flexible substrate 31, it is only necessary that a plurality of the slits 31*s* (three in FIG. 16) that have been described above are formed between the protruding portions 31*p* adjacent to each other.

With this configuration, at the time when all the connector insertion portions 31*t* are inserted into the connectors 32*a*, it is possible to easily insert these connector insertion portions 31*t*.

In addition, since it is possible to lengthen the heat transfer path from one driver IC 33 to another driver IC 33 at the flexible substrate 31, it is possible to reduce the thermal interference between the driver ICs 33 adjacent to each other.

Figure 17:
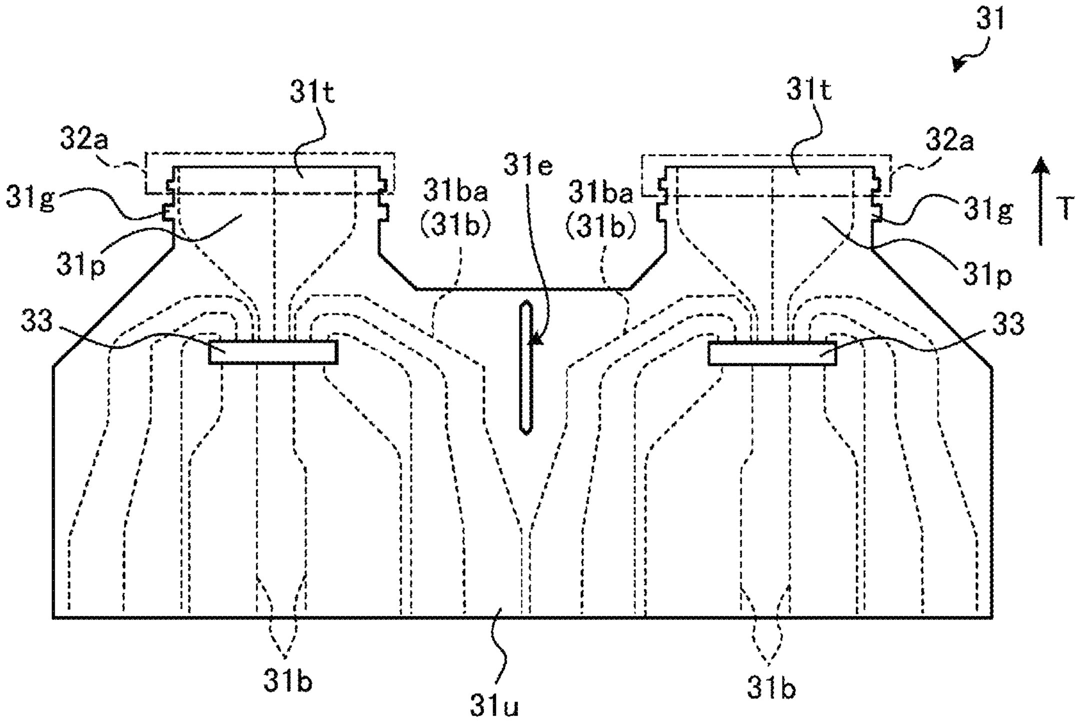
FIG. 17 is a diagram used to explain an entire configuration of a flexible substrate according to a seventh modification example of the embodiment.

FIG. 17 is a diagram used to explain the entire configuration of the flexible substrate 31 according to a seventh modification example of the embodiment. Note that, in FIG. 17, the positions of the corresponding connectors 32*a* are illustrated with the long dashed short dashed lines.

As illustrated in FIG. 17, the flexible substrate 31 includes a plurality of the protruding portions 31*p* (two in FIG. 17) configured to protrude in the same direction. These protruding portions 31*p* protrude in the inserting direction T of the connector insertion portion 31*t*.

In addition, since the flexible substrate 31 has flexibility and the widths of the protruding portions 31*p* are configured to be reduced, the flexible substrate 31 has a shape that makes it easy to insert the connector insertion portions 31*t* into the connectors 32*a* at the time of insertion.

Furthermore, in the seventh modification example, a through hole 31*e* is formed between the protruding portions 31*p* adjacent to each other at the flexible substrate 31. Such a through hole 31*e* is formed so as to extend from a side (the upper side in FIG. 17) from which the protruding portions 31*p* protrude and in a direction (downward direction in FIG. 17) opposite to the direction in which the protruding portions 31*p* protrude.

However, unlike the slit 31*s*, the through hole 31*e* does not reach the same side as the side from which the protruding portions 31*p* protrude at the flexible substrate 31. That is, the through hole 31*e* is closed with respect to the same side as the side from which the protruding portions 31*p* protrude at the flexible substrate 31.

Furthermore, in the seventh modification example, the through hole 31*e* extends up to a region between the driver ICs 33 adjacent to each other on the same main surface of the flexible substrate 31. That is, the through hole 31*e* is formed so as to separate adjacent driver ICs 33 from each other.

With this configuration, it is possible to lengthen the heat transfer path from one driver IC 33 to another driver IC 33 at the flexible substrate 31. Thus, with the seventh modification example, it is possible to reduce the thermal interference between the driver ICs 33 adjacent to each other.

Figure 18:
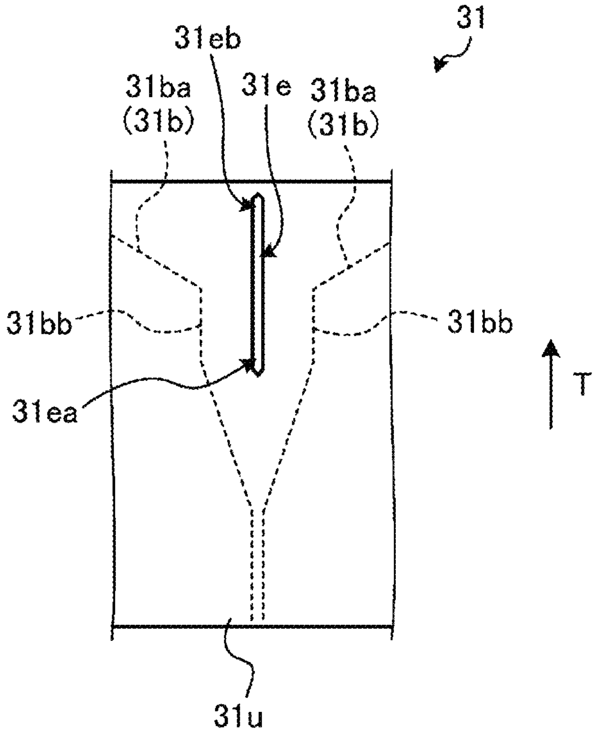
FIG. 18 is an enlarged view illustrating a configuration of a flexible substrate according to a seventh modification example of the embodiment.

FIG. 18 is an enlarged view illustrating the configuration of the flexible substrate 31 according to the seventh modification example of the embodiment, and is a diagram used to explain a positional relationship between the through hole 31*e* and the wiring layers 31*ba* at the flexible substrate 31.

As illustrated in FIG. 18, in the seventh modification example, the width of the through hole 31*e* is substantially equal throughout the entire region, and falls in a range, for example, of approximately 1 to 2 mm. In addition, the through hole 31*e* extends so as to be along the inserting direction T of the connector insertion portion 31*t*.

In the seventh modification example, it is preferable that the width of the through hole 31*e* is equal to or less than a predetermined value (for example, 2 mm). If the width of the through hole 31*e* is greater than this predetermined value, there is a possibility that the through hole 31*e* and the wiring layer 31*ba* interfere with each other.

However, in the seventh modification example, since the width of the through hole 31*e* is set to be equal to or less than the predetermined value, it is possible to suppress a failure resulting from the through hole 31*e* and the wiring layer 31*ba* interfering with each other.

In addition, in the seventh modification example, it is preferable that the wiring layer 31*ba* of the flexible substrate 31 includes the portion 31*bb* extending along the through hole 31*e*. This makes it possible to enhance the rigidity of the flexible substrate 31 in the vicinity of the through hole 31*e*.

Note that, unlike the slit 31*s* that has been described above, the planar shape of the through hole 31*e* may be configured such that neither an end portion 31*ea* nor an end portion 31*eb* has a rounded shape, as illustrated in FIG. 18. Furthermore, unlike the slit 31*s* that has been described above, the reinforcing plate 31*d* is not always necessary to be provided at the periphery of the end portions 31*ea* and 31*eb* at the through hole 31*e*.

This is because, since the through hole 31*e* is closed to the side surface of the flexible substrate 31, there is no possibility that stress concentrates on the through hole 31*e* even at the time when the flexible substrate 31 is deformed.

Furthermore, in the seventh modification example, a portion extending from the through hole 31*e* to the pressing member 34 is exposed to the heat dissipation plate 50. Thus, by causing the pressing member 34 exposed from the through hole 31*e* to be brought into direct contact with the heat dissipation plate 50, it is possible to favorably transfer, to the heat dissipation plate 50, the heat transferred from the driver IC 33 to the pressing member 34. Thus, with the seventh modification example, it is possible to favorably dissipate the heat generated from the driver IC 33.

Although embodiments of the present disclosure are described above, the present disclosure is not limited to the embodiments described above, and various modifications can be made without departing from the spirit thereof. For example, the embodiment described above gives an example in which the shank 31*g* is provided in the vicinity of the connector insertion portion 31*t* of the protruding portion 31*p*. However, the shank 31*g* may not be necessarily provided.

As described above, the liquid discharge head 8 according to the embodiment includes the head body 20, the plurality of driver ICs 33, the flexible substrate 31, and the wiring board 32. The head body 20 includes the discharge hole 63 configured to discharge a liquid. The plurality of driver ICs 33 control drive of the head body 20. The plurality of driver ICs 33 are mounted at the flexible substrate 31, and the flexible substrate 31 is electrically connected to the head body 20. The wiring board 32 includes the plurality of connectors 32*a*. In addition, the flexible substrate 31 includes the plurality of protruding portions 31*p* configured to protrude in the same direction and each including a tip portion (connector insertion portion 31*t*) to be inserted into corresponding one of the plurality of connectors 32*a*, and also includes the slit 31*s* formed between the protruding portions 31*p* adjacent to each other and extending up to a region between the driver ICs 33 adjacent to each other. This makes it possible to reduce the thermal interference between the driver ICs 33 adjacent to each other. Furthermore, since the slit 31*s* is provided between the protruding portions 31*p*, it is possible to improve operability of each of the protruding portions 31*p*.

In addition, in the liquid discharge head 8 according to the embodiment, the wiring layer 31*ba* of the flexible substrate 31 includes the portion 31*bb* extending along the slit 31*s*. With this configuration, it is possible to enhance the rigidity of the flexible substrate 31 in the vicinity of the slit 31*s*.

Furthermore, in the liquid discharge head 8 according to the embodiment, the tip portion 31*sa* of the slit 31*s* has a rounded shape. This makes it possible to prevent the flexible substrate 31 from being torn at the time when the vicinity of the silt 31*s* is deformed.

Furthermore, in the liquid discharge head 8 according to the embodiment, the wiring layer 31*ba* of the flexible substrate 31 extends so as to be in contact with the imaginary circle C concentric with the rounded shape formed at the tip portion 31*sa* of the slit 31*s*. This makes it possible to suppress a failure (for example, short circuit of the wiring layer 31*ba* or the like) occurring as a result of the slit 31*s* and the wiring layer 31*ba* being close to each other.

Furthermore, in the liquid discharge head 8 according to the embodiment, the wiring layer 31*ba* of the flexible substrate 31 is disposed so as to surround the tip portion 31*sa* of the slit 31*s*. This makes it possible to prevent the flexible substrate 31 from being torn at the time when the vicinity of the silt 31*s* is deformed.

Furthermore, in the liquid discharge head 8 according to the embodiment, the flexible substrate 31 includes the reinforcing plate 31*d* at the periphery of a portion where the slit 31*s* extends. This makes it possible to prevent the flexible substrate 31 from being broken from the periphery of the portion where the slit 31*s* extends.

Furthermore, in the liquid discharge head 8 according to the embodiment, the flexible substrate 31 includes the reinforcing plate 31*d* at the periphery of the tip portion 31*sa* of the slit 31*s*. This makes it possible to prevent the flexible substrate 31 from being broken from the periphery of the tip portion 31*sa* of the slit 31*s*.

Furthermore, in the liquid discharge head 8 according to the embodiment, the flexible substrate 31 is configured such that the wiring layer 31*b* is not provided at a portion where the reinforcing plate 31*d* is provided. This makes it possible to prevent the wiring layer 31*b* from being broken at the time when a portion of the flexible substrate 31 that corresponds to the slit 31*s* is stamped out together with the reinforcing plate 31*d* to form the slit 31*s*.

Furthermore, in the liquid discharge head 8 according to the embodiment, the slit 31*s* is formed at the center between the protruding portions 31*p* adjacent to each other. This makes it easy to equally insert the individual connector insertion portions 31*t*.

Furthermore, in the liquid discharge head 8 according to the embodiment, the slit 31*s* is configured such that the width of the base end portion 31*sb* is wider than the width of the portion other than the base end portion 31*sb* and the tip portion 31*sa*. This makes it possible to prevent the flexible substrates 31 at both side of the base end portion 31*sb* from being rubbed with each other.

Furthermore, the liquid discharge head 8 according to the embodiment includes the head body 20, the plurality of driver ICs 33, the flexible substrate 31, and the wiring board 32. The head body 20 includes the discharge hole 63 configured to discharge a liquid. The plurality of driver ICs 33 control drive of the head body 20. The plurality of driver ICs 33 are mounted at the flexible substrate 31, and the flexible substrate 31 is electrically connected to the head body 20. The wiring board 32 includes the plurality of connectors 32*a*. In addition, the flexible substrate 31 includes the plurality of protruding portions 31*p* configured to protrude in the same direction and each including the tip portion (connector insertion portion 31*t*) to be inserted into corresponding one of the plurality of connectors 32*a*, and also includes a through hole 31*e* formed along a protruding direction of the protruding portions 31*p* and extending up to a region between the driver ICs 33 adjacent to each other. This makes it possible to reduce the thermal interference between the driver ICs 33 adjacent to each other.

In addition, the recording device (printer 1) according to the embodiment includes the liquid discharge head 8 described above, the conveying unit (conveying roller 6) configured to convey a recording medium (printing sheet P) to the liquid discharge head 8, and the controller 14 configured to control the plurality of driver ICs 33 of the liquid discharge head 8. This makes it possible to achieve the printer 1 in which thermal interference between the driver ICs 33 adjacent to each other is reduced.

In addition, the recording device (printer 1) according to the embodiment includes the liquid discharge head 8 described above, and the applicator 4 configured to apply the coating agent on a recording medium (printing sheet P). With surface treatment thus performed on the printing sheet P, the printing quality of the printer 1 can be improved.

In addition, the recording device (printer 1) according to the embodiment includes the liquid discharge head 8 described above, and the dryer 10 that dries a recording medium (printing sheet P). With this configuration, it is possible to suppress the bonding between the printing sheets P rolled while being overlapped with each other, and rubbing of undried liquid, in the collection roller 13.

Noted that the embodiment disclosed herein is exemplary in all respects and not restrictive. Indeed, the aforementioned embodiment can be embodied in a variety of forms. Furthermore, the aforementioned embodiment may be omitted, replaced, or changed in various forms without departing from the scope of the appended claims and the purpose thereof.

REFERENCE SIGNS LIST

1 Printer (example of recording device)
4 Applicator
6 Conveying roller (example of conveyor)
7 Frame
8 Liquid discharge head
10 Dryer
14 Controller
20 Head body
31 Flexible substrate
31*b*, 31*ba* Wiring layer
31*bb* Portion
31*d* Reinforcing plate
31*e* Through hole
31*p* Protruding portion
31*s* Slit
31*sa* Tip portion
31*sb* Base end portion

31*t* Connector insertion portion (one example of tip portion)

32 Wiring board

32*a* Connector

33 Driver IC

63 Discharge hole

C Imaginary circle

P Printing sheet (example of recording medium)

The invention claimed is:

1. A liquid discharge head, comprising:

a head body comprising a discharge hole configured to discharge a liquid;

a plurality of driver ICs configured to control drive of the head body;

a wiring board comprising a plurality of connectors; and a flexible substrate at which the plurality of driver ICs is mounted, the flexible substrate being electrically connected to the head body and comprising:

a plurality of protruding portions configured to protrude in a same direction, each of the plurality of protruding portions including a tip portion to be inserted into a corresponding one of the plurality of connectors; and a slit formed between adjacent protruding portions of the plurality of protruding portions and extending up to a region between adjacent driver ICs of the plurality of driver ICs, wherein the flexible substrate further comprises a reinforcing plate that is disposed at at least one of (i) a periphery of a portion where the slit extends, or (ii) a periphery of a tip portion of the slit, and the flexible substrate further comprises a wiring layer which is not provided at a portion where the reinforcing plate is provided.

2. The liquid discharge head according to claim 1, wherein a wiring layer of the flexible substrate includes a portion extending along the slit.

3. The liquid discharge head according to claim 1, wherein a tip portion of the slit has a rounded shape.

4. The liquid discharge head according to claim 3, wherein a wiring layer of the flexible substrate extends and is in contact with an imaginary circle concentric with a rounded shape formed at the tip portion of the slit.

5. The liquid discharge head according to claim 1, wherein a wiring layer of the flexible substrate is disposed to surround a tip portion of the slit.

6. The liquid discharge head according to claim 1, wherein the slit is formed at a center between the adjacent protruding portions.

7. The liquid discharge head according to claim 1, wherein the slit is configured such that a width of a base end portion is wider than a width of a portion other than the base end portion and the tip portion.

8. A recording device comprising:

the liquid discharge head according to claim 1;

a conveying unit configured to convey a recording medium to the liquid discharge head; and a controller configured to control the plurality of driver ICs of the liquid discharge head.

9. A recording device comprising:

the liquid discharge head according to claim 1; and an applicator configured to apply a coating agent over a recording medium.

10. A recording device comprising:

the liquid discharge head according to claim 1; and a dryer configured to dry a recording medium.

11. The liquid discharge head according to claim 1, wherein the flexible substrate further comprises a base substrate composed of an insulation body, the wiring layer, composed of an electroconductive body, is at one surface of the base substrate, and the reinforcing plate is at another surface of the base substrate opposite to the one surface.

12. The liquid discharge head according to claim 11, wherein the reinforcing plate is at and surrounds a peripheral edge of the slit, and the slit has a tip portion having a rounded shape.

* * * * *